May 4, 1965
D. E. LUPFER
3,182,005
FRACTIONATOR REBOILER HEAT AND BOTTOMS PRODUCT CONTROL SYSTEM
Filed Jan. 3, 1961
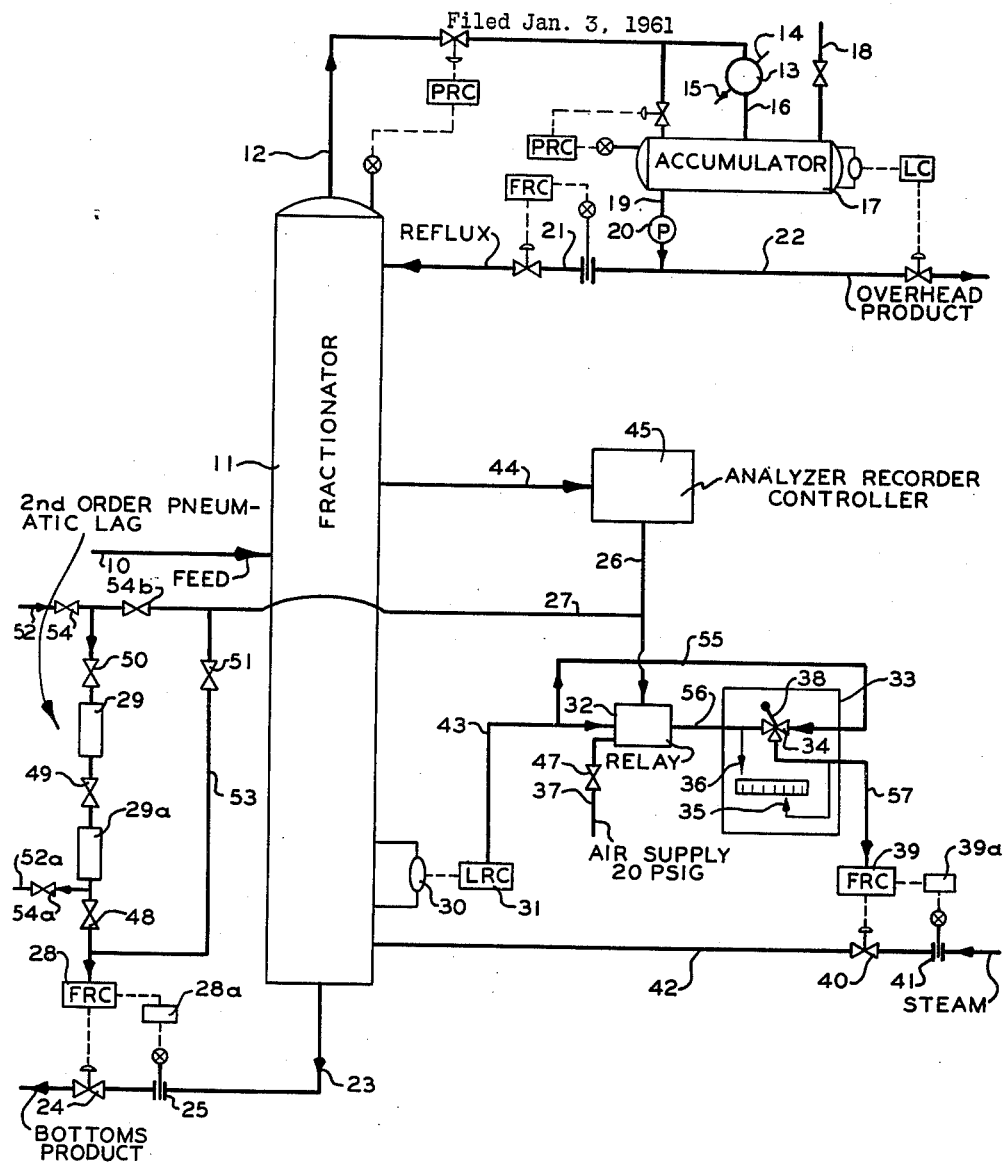
INVENTOR.
D. E. LUPFER
BY Hudson and Young
ATTORNEYS United States Patent Office 3,182,005
Patented May 4, 1965

3,182,005
FRACTIONATOR REBOILER HEAT AND BOTTOMS PRODUCT CONTROL SYSTEM
Dale E. Lupfer, Bartlesville, Okla., assignor to Phillips Petroleum Company, a corporation of Delaware
Filed Jan. 3, 1961, Ser. No. 80,462
5 Claims. (Cl. 202—40)

This invention relates to control of fractional distillation columns. In one aspect, it relates to the control or regulation of bottoms product and reboiler operation of a fractional distillation column. In another aspect, it relates to regulation of bottoms product withdrawal and addition of reboiler heat in response to liquid level in the kettle section of the column and in further response to analysis of fluid in the process with respect to a key component.

As is realized by those skilled in the art, there are many variables which can affect the operation of a distillation column. Proper operation of distillation units requies that the specified operation be maintained by adjustment of the manipulatable variable as the uncontrollable inputs vary. For example, feed flow rate and composition are uncontrollable inputs, that is, the fractionator must take whatever feed flow and composition are supplied. If there is a change in feed flow rate or composition the reboiler heat input and reflux flow rates must be adjusted to compensate for these changes if the terminal stream specifications are to be maintained.

Conventional fractionator control practice involves the application of an analyzer-controller or temperature controller. In either case the devices are applied so as to measure the conditions of one of the column terminal streams. For example, a temperature contoller may obtain its measurement several trays from the top of a column as an indication of overhead product purity. If the bottoms product stream is more important than the overhead steam the controller will obtain a measure at or near the bottom of the column. In either case the controller will manipulate the reboiler heat or the reflux flow to maintain the measurement constant. If the controller manipulates the reflux flow it is necessary for the reboiler heat to be adjusted manually to achieve the overall desired separation. If the controller manipulates the reboiler heat then the reflux flow must be adjusted manually. The larger percentage of fractionator primary control schemes fall in the latter category because the control dynamics are somewhat better when the reboiler heat is the manipulated variable.

Heat is supplied to the reboiler of many fractionators by steam. It is common practice to regulate the flow of steam to the reboiler by manipulation of a valve or in many cases by a conventional volume flow controller. The primary controller will either manipulate the steam flow directly or the set point of the flow controller, depending upon which is used. In these systems the rate of bottoms product flow from the column is manipulated by the kettle level controller.

These systems, as conventionally applied, have several disadvantages. The first is that the bottoms flow rate is very erratic becasue as small heat disturbances enter the column the kettle level is changed before the primary control system can compensate for the heat disturbance. The changing kettle level causes the bottoms flow to vary. This effect is more pronounced when a high reflux to feed ratio operation is required. Heat disturbances originate mainly due to fluctuation in steam supply pressure. It is common practice when an erratic bottoms flow exists to detune the kettle level controller to help smooth out this flow. It is important to obtain a smooth bottoms flow in many cases since this stream may be the feed to another fractionator or unit. Detuning the kettle level controller results in poor regulation of kettle level and can further result in a lowering of the column efficiency, especially if an internal reboiler is in use. I propose a method of control which specifically results in a smoother bottoms product flow, better regulation of kettle level, and a more uniform operating primary control system.

An object of this invention is to provide an improved method and means for regulating the operation of a fractional distillation column. Another object of this invention is to provide apparatus and a method for the regulation of the operation of a fractional distillation column which regulation is automatic and provides for production of products of relatively uniform composition. Still another object of this invention is to provide a method and apparatus for the regulation or control of the fractional distillation column which apparatus and method are relatively simple and easy to operate. Still another object of this invention is to provide relatively inexpensive apparatus for the improved control of fractional distillation columns. Still other objects and advantages of this invention will be realized upon reading the following description which, taken with the attached drawing, forms a part of this specification.

The drawing illustrates, in diagrammatic form, one arrangement of apparatus parts for carrying out the objects of this invention.

Briefly, the apparatus comprises a fractional distillation column 11 provided with conventional vapor-liquid contact promoting apparatus such as bubble cap trays or other suitable packing apparatus. The column is provided with a conduit 10 for introduction of feed material to be fractionated. A conduit 12 provides for withdrawal of overhead vapors and passage thereof to an overhead condenser 13 having conduits 14 and 15 for inlet and outlet, respectively, of a cooling fluid. A conduit 16 provides for passage of condenser effluent to an accumulator tank 17. This tank is provided with a valved conduit 18 for pressure relief if and when necessary. Condensate from the accumulator 17 passes through a conduit 19 under the influence of a pump 20 and a portion of the condensate is passed through a conduit 21 to the upper portion of column 11 as reflux while the remainder of the condensate is passed through a conduit 22 as an overhead product for such disposal as desired. Other apparatus illustrated in the drawing is conventionally used in overhead column control. A conduit 23 is provided at the bottom of the column for withdrawal of bottoms product. This conduit is provided with a motor valve 24 and an orifice plate assembly 25 which parts are portions of a flow rate controller assembly. This assembly also includes a square root extractor 28a. The flow rate controller box with its contents is identified by reference numeral 28.

A small diameter conduit 44 is provided at a selected level in the column for withdrawal of a sample stream of fluid in process. This conduit 44 leads to an analyzer-recorder-controller 45. In case the analyzer portion of apparatus 45 requires vapors for analysis, the conduit 44 can, if desired, withdraw vapor from the fractionator 11 or if liquid or liquid and vapor are withdrawn, then conduit 44 should be provided with an evaporator for conversion of any liquid to the vapor phase. Steam for providing reboiling heat passes from a source, not shown, through a conduit 42 to the reboiler section of the column. This steam can be introduced directly into the fractionator or, if desired, it can be passed through an indirect heat exchange coil, not shown. Conduit 42 is provided with a motor valve 40 and an orifice plate assembly 41, the latter being connected with a square root extractor 39a which in turn is connected with a flow rate controller 39.

The flow rate controllers 28 and 39 can also, if desired, be recorders such as the Foxboro Type M-40, described in Foxboro Company Bulletin 450, Foxboro, Massachusetts. However, suitable flow controller-recorders are also available from other instrument supply houses. The square root extractors can be Minneapolis-Honeywell Sorteberg force bridge extractors described in U.S. Patent 2,643,055.

A conduit 26 conducts a signal from the analyzer-recorder-controller 45 to a computing relay 32, which can be a Foxboro Model 56/1 computing relay, described in Foxboro Bulletin TI-37-57a. A conduit 27 communicates with conduit 26 for passage of the signal from the analyzer-recorder-controller 45 by way of a second order pneumatic lag mechanism 50, 29, 49 and 29a to a flow recorder-controller 28. These mechanisms are actually valves and small tanks to provide restrictions and volume for lagging the pneumatic signal from the controller 45 to the flow recorder-controller 28. This conduit 27 is provided with manually operable valves 54b and 48 in the positions illustrated in the drawing. By-pass conduit 53 is provided with a manually operable valve 51.

The distillation column 11 is also provided with a liquid level sensing apparatus 30 which is so constructed as to emit a signal proportional to the level of liquid in the column to a level recorder-controller 31. This controller emits a signal through a conduit 43 to the subtracting relay 32. Conduit 37 provides for passage of air from a source, not shown, to the relay. Conduit 37 is provided with a manually operable pressure regulator 47 for regulation of the pressure of the air supplied the relay. A panel or box 33 is provided with a 3-way valve 34 having a manually actuatable valve handle 38. By moving this handle 38, the valve can be changed from one position to another. For example, moving the handle to the left opens a passageway communicating a conduit 55 with a conduit 57. Moving the handle 38 to the right closes conduit 57 from conduit 55 and opens a passageway between conduits 56 and 57. The panel 33 is also provided with operable pen arms 36 and 35 which are so arranged as to indicate pressure respectively in conduits 56 and 57.

The apparatus as disclosed in this specification is considered to be pneumatic apparatus. However, if desired, electronic regulators, controllers and the like can be used. In many instances, pneumatic equipment is preferred because it is relatively simple, easy to install, operate and to service. Pneumatic equipment is also less hazardous and in many instances it is less expensive than electronic equipment.

The analyzer-recorder-controller 45 can be any suitable analyzer-recorder-controller desired. It can be an ultraviolet recorder-controller such as disclosed in U.S. Patent 2,764,692. It can be a chromatographic analyzer-recorder such as described in U.S. Patent 2,875,606. A suitable chromatographic analyzer-recorder-controller is also described in a copending application, Serial No. 746,768, filed July 7, 1958. This latter chromatographic analyzer includes a peak reader which is, of course, a necessary part of the complete apparatus. Also, a high speed chromatographic analyzer-recorder-controller apparatus is described by Phillips Petroleum Company in ISA Journal, May 1960, page 76.

In the general operation of the control apparatus of this invention, a pneumatic signal emitted from analyzer-recorder-controller 45 is transmitted through conduit 26 to relay 32. This pneumatic signal is algebraically summed with the signals in conduit 43 and the signal supplied by pressure regulator 47. If the pressure in conduit 26 increases one p.s.i. then the pressure in conduit 56 will decrease one p.s.i. If the pressure in conduit 43 increases one p.s.i. then the pressure in conduit 56 will also increase one p.s.i. An increase of one p.s.i. by regulator 47 will also cause the pressure in conduit 56 to increase one p.s.i. In case the equipment is in automatic operation, valve 34 is open to communicate the signal from conduit 56 through conduit 57 to the flow recorder-controller 39 to open or to throttle motor valve 40 as required.

For splitting a feedstock into an overhead product and a bottom product, this control system involves either analysis for a heavy component at some location above the feed tray or analysis of a light component below the feed tray. Whichever component is used as the key component depends upon which terminal stream is most important. These analyses are best made in either the overhead vapor line 12 or in the kettle, providing adequate measurement sensitivity exists. For descriptive purposes I will consider the analysis to be made for the heavy component above the feed tray as shown in FIGURE 1. When this analysis shows the concentration of the heavy component to be too high, the heat input to the reboiler should be reduced. In such a case, i.e., when the heavy component concentration in sample line 44 increases beyond the set point applied to controller 45, output signal 26 from controller 45 increases. Output signal 56 from relay 32 thus becomes smaller and application of this signal 56 to controller 39 via valve 34 and line 57 causes the steam flow and hence reboiler heat input to decrease. This decrease in turn reduces the boil-up of heavy components in the fractionator and the concentration of heavy component in sample line 44 decreases to the desired value. Simultaneously with the application of increased signal through 26, 56 and 57 to controller 39 for steam flow reduction, increased signal in 26 is also applied via line 27 and second order lag device 50, 29, 49 and 29a to controller 28 so as to increase the flow of bottoms product. The second order lag device is adjusted to delay the passage of signal from 26 to controller 28 until the reduced steam flow in line 42 begins to affect the reboiler liquid level. If the second order lag is properly adjusted the bottom product flow will increase in time exactly as the vapor flow out of the kettle decreases in time. The result here is that for a change of signal in conduit 26 the kettle level will not show a change because the resulting vapor flow change from the kettle will be exactly compensated for by the change in bottom product flow. Without application of signal 26 to controller 28 via the second order lag the liquid level would have increased. The increase would have been sensed by level transmitter 30 and a correction would have been applied by level controller 31. The steam would have been returned to its same flow as existed before the signal in conduit 26 changed. In the arrangement of this invention the kettle level will not change as a result of changes in pneumatic signal in conduit 26.

The main function which level controller 31 performs is associated with heat supply disturbances which propagate into the system via the steam supply line. If, for example, the steam supply pressure should increase then more heat is introduced into the system. An increase in heat input will result in an increase in vapor flow out of the kettle. The kettle level will initiate a change which will be sensed by level controller 31. This level controller will return the heat input to its proper value long before composition is affected at the analyzer location. Fractionator performance, i.e., separation of a feed stream into overhead and bottoms products of constant purity, is maintained by controller 45 which also manipulates the steam flow as just described without causing fluctuations in the reboiler liquid level.

In starting up such an operation as herein disclosed, the flow controller 39 on the reboiling steam line is placed on automatic operation by first setting the set point of the controller at a point or at a setting at which the operator believes will provide sufficient steam for the operation. Also, the flow controller 28 is also placed on automatic operation by adjusting its set point to provide for a rate of withdrawal of bottoms product believed to be about that required for normal fractionator operation. The level recorder-controller 31 is used for recording purposes only as is the analyzer-recorder-controller 45. The lag tanks 29 and 29a are closed from the circuit by closing valves 48 and 54b and opening valve 51 in by-pass conduit 53 so that no lag in signal passage is obtained. The subtracting relay 32 is set for unity gain and should be accurately set.

The system is operated manually by adjusting flow controllers 28 and 39 set points until the operation is essentially constant at the desired level. By constant is meant that the analysis at the analyzer location is that desired and that kettle level is at the value desired. For this operation controllers 45 and 31 are on manual operation, that is, the output signal from each controller is equal to the set point applied manually to the controller. Valve 38 is positioned so that conduit 43 communicates with conduit 57.

With the system operating as described above and with the reboiler level holding constant, the second order lag device is checked and adjusted.

This adjustment is accomplished by closing valves 54 and 48. A step change can then be introduced from conduit 52 through valve 54, through the second order lag 50, 29, 49, 29a and out through 54a for recording. Valves 50 and 49 are adjusted until the desired response shape is obtained through the second order lag. With the lag adjusted to what is believed the proper shape a check is next made to validate the lag adjustment. This checking is accomplished by closing valves 54, 54a and 51; opening valves 54b and 48. The pressure in conduit 26 is then step changed by manually changing the set point of controller 45. If no change in kettle level results then the second order lag is properly adjusted. The system is now ready to be placed in automatic control service. This change is accomplished by first adjusting pressure regulator 47 until the pressure in conduit 56, which is shown by indicator 36, is the same as the pressure in conduit 57, which is shown by indicator 35. Then, with indicator 36 aligned with 35, valve 38 can be switched to the position which connects conduit 56 to 57. Level controller 31 and analyzer controller 45 are then switched from manual to automatic.

A liquid level recorder-controller suitable for use as controller 31 can be obtained from many instrument supply houses. Their installation and operation are well understood by those skilled in the art.

Such auxiliary apparatus as valves, pumps, temperature and pressure indicating, recording and control apparatus are not disclosed for purposes of brevity and simplicity. The need for such auxiliary equipment, its installation and maintenance are well understood by those skilled in the art.

I have found by operating and controlling a fractional distillation system as herein disclosed, that the operation is more uniform. Such a control system will attain the same degree of control as the conventional analyzer to steam, kettle level control to bottom flow system, but with the added advantages of smoother bottom flow, better kettle level control and exclusion of heat disturbances from the analyzer control loop.

A source of instrument air for actuation of the herein-disclosed pneumatic devices is not shown for brevity and simplicity. The need for such air, etc., is well understood by those skilled in the art.

While certain embodiments of the invention have been described for illustrative purposes, the invention obviously is not limited thereto.

I claim:

1. In a fractional distillation system comprising, in combination, a fractional distillation column; means for introducing into said column a fluid mixture to be fractionated; means for withdrawing from said column an overhead fraction; means for withdrawing from said column a bottoms fraction; and means for passing a heating fluid in heat exchanging relationship with the contents of the kettle section of said column; the improvement comprising means for withdrawing a sample stream of fluid from a predetermined point in said column above the point of introduction of said fluid mixture to be fractionated, analyzing the thus withdrawn sample stream and establishing a first signal representative of the concentration of a desired heavy component in said sample stream such that an increase in the concentration of said desired heavy component results in an increase in said first signal, means in operative communication with the kettle section of said column for establishing a second signal representative of the liquid level in said kettle section, means responsive to said first and second signals for establishing a third signal representative of said second signal minus said first signal so that an increase in said second signal causes an increase in said third signal while an increase in said first signal causes a decrease in said third signal, means responsive to said third signal for controlling the flow of said heating fluid in heat exchanging relationship with the contents of the kettle section of said column such that an increase in said third signal results in an increase in heat input to said column while a decrease in said third signal results in a decrease in heat input to said column, means responsive to said first signal for establishing a fourth signal representative of a lag function of said first signal, and means responsive to said fourth signal for controlling the rate of withdrawal of said bottoms fraction from said column such that an increase in said fourth signal causes an increase in the rate of withdrawal of said bottoms fraction from said column while a decrease in said fourth signal causes a decrease in the rate of withdrawal of said bottoms fraction from said column, thereby substantially eliminating variations in the liquid level in said kettle section resulting from a change in said first signal.

2. In a fractional distillation system comprising, in combination, a fractional distillation column; means for introducing into said column a fluid mixture to be fractionated; means for withdrawing from said column an overhead fraction; means for withdrawing from said column a bottoms fraction; and means for passing a heating fluid in heat exchanging relationship with the contents of the kettle section of said column; the improvement comprising means for withdrawing a sample stream of fluid from a predetermined point in said column below the point of introduction of said fluid mixture to be fractionated, analyzing the thus withdrawn sample stream and establishing a first signal representative of the concentration of a desired light component in said sample stream such that an increase in the concentration of said desired light component results in a decrease in said first signal, means in operative communication with the kettle section of said column for establishing a second signal representative of the liquid level in said kettle section, means responsive to said first and second signals for establishing a third signal representative of said second signal minus said first signal so that an increase in said second signal causes an increase in said third signal while an increase in said first signal causes a decrease in said third signal, means responsive to said third signal for controlling the flow of said heating fluid in heat exchanging relationship with the contents of the kettle section of said column such that an increase in said third signal results in an increase in heat input to said column while a decrease in said third signal results in a decrease in heat input to said column, means responsive to said first signal for establishing a fourth signal representative of a lag function of said first signal, and means responsive to said fourth signal for controlling the rate of withdrawal of said bottoms fraction from said column such that an increase in said fourth signal causes an increase in the rate of withdrawal of said bottoms fraction from said column while a decrease in said fourth signal causes a decrease in the rate of withdrawal of said bottoms fraction from said column, thereby substantially eliminating variations in the liquid level in said kettle section resulting from a change in said first signal.

3. In a fractional distillation system comprising, in combination, a fractional distillation column; means for introducing into said column a fluid mixture to be fractionated; means for withdrawing from said column an overhead fraction; means for withdrawing from said column a bottoms fraction; and means for passing a heating fluid in heat exchanging relationship with the contents of the kettle section of said column; the improvement comprising means for establishing a first signal representative of the composition of the fluid at a predetermined point in said column, means in operative communication with the kettle section of said column for establishing a second signal representative of the liquid level in said kettle section, means responsive to said first and second signals for establishing a third signal representative of the algebraic summation of said second signal and said first signal, means responsive to said third signal for controlling the flow of said heating fluid in heat exchanging relationship with the contents of the kettle section of said column to maintain said first signal and said second signals substantially constant, means responsive to said first signal for establishing a fourth signal representative of a lag function of said first signal, and means responsive to said fourth signal for controlling the rate of withdrawal of said bottoms fraction from said column such that the variations in the liquid level in said kettle section resulting from a change in said first signal are substantially eleminated.

4. In a method for controlling a fractional distallation system a fluid mixture to be fractionated is introduced into a fractional distillation zone; an overhead fraction is withdrawn from said zone; a bottoms fraction is withdrawn from said zone; and a heating fluid is passed in heat exchanging relationship with the contents of the kettle section of said zone; the improvement comprising establishing a first signal representative of the concentration of a desired light component in the fluid at a predetermined point in said zone below the point of introduction of said fluid mixture to be fractionated such that an increase in the concentration of said desired light component results in a decrease in said first signal, establishing a second signal representative of the liquid level in said kettle section, establishing responsive to said first and second signals a third signal representative of the algebraic summation of said second signal and said first signal so that an increase in said second signal causes an increase in said third signal while an increase in said first signal causes a decrease in said third signal, controlling responsive to said third signal the flow of said heating fluid in heat exchanging relationship with the contents of the kettle section of said zone such that an increase in said third signal results in an increase in heat input to said column while a decrease in said third signal results in a decrease in heat input to said zone, establishing responsive to said first signal a fourth signal representative of a lag function of said first signal, and controlling responsive to said fourth signal the rate of withdrawal of said bottoms fraction from said zone such that an increase in said fourth signal causes an increase in the rate of withdrawal of said bottoms fraction from said zone while a decrease in said fourth signal causes a decrease in the rate of withdrawal of said bottoms fraction from said zone.

5. In a method for controlling a fractional distillation system a fluid mixture to be fractionated is introduced into a fractional distillation zone; an overhead fraction is withdrawn from said zone; a bottoms fraction is withdrawn from said zone; and a heating fluid is passed in heat exchanging relationship with the contents of the kettle section of said zone; the improvement comprising establishing a first signal representative of the concentration of a desired heavy component in the fluid at a predetermined point in said zone above the point of introduction of said fluid mixture to be fractionated such that an increase in the concentration of said desired heavy component results in an increase in said first signal, establishing a second signal representative of the liquid level in said kettle section, establishing responsive to said first and second signals a third signal representative of the algebraic summation of said second signal and said first signal so that an increase in said second signal causes an increase in said third signal while an increase in said first signal causes a decrease in said third signal, controlling responsive to said third signal the flow of said heating fluid in heat exchanging relationship with the contents of the kettle section of said zone such that an increase in said third signal results in an increase in heat input to said column while a decrease in said third signal results in a decrease in heat input to said zone, establishing responsive to said first signal a fourth signal representative of a lag function of said first signal, and controlling responsive to said fourth signal the rate of withdrawal of said bottoms fraction from said zone such that an increase in said fourth signal causes an increase in the rate of withdrawal of said bottoms fraction from said zone while a decrease in said fourth signal causes a decrease in the rate of withdrawl of said bottoms fraction from said zone.

References Cited by the Examiner

UNITED STATES PATENTS

| | | | |
|---|---|---|---|
| 2,476,280 | 7/49 | Bragg et al. | 202—160 X |
| 2,749,281 | 6/56 | Ferro | 202—160 X |
| 2,881,118 | 4/59 | Spann | 202—160 |
| 2,882,693 | 4/59 | Clay | 202—160 X |
| 2,893,927 | 7/59 | Mertz et al. | 202—160 |
| 2,977,289 | 3/61 | Kron | 202—160 X |
| 2,985,565 | 5/61 | Bellinger | 202—160 |
| 2,990,437 | 6/61 | Berger | 202—160 X |
| 2,992,976 | 7/61 | Cottle | 202—160 |

FOREIGN PATENTS 787,763   12/57   Great Britain.

NORMAN YUDKOFF, Primary Examiner.

RICHARD D. NEVIUS, ALPHONSO D. SULLIVAN, GEORGE D. MITCHELL, Examiners.